United States Patent [19]

Pauw et al.

[11] Patent Number: 5,582,840
[45] Date of Patent: Dec. 10, 1996

[54] DEVICE FOR THE CONTINUOUS MANUFACTURE OF SLABSTOCK POLYURETHANE FOAM

[75] Inventors: Hendrik Pauw, Utrecht, Netherlands; Brian J. Blackwell, Prestburg, United Kingdom; Robertus H. Evers, Elst, Netherlands; Rudi Mortelmans, Temse, Belgium

[73] Assignee: Prefoam AG, Basel, Switzerland

[21] Appl. No.: 343,607

[22] PCT Filed: Jun. 1, 1992

[86] PCT No.: PCT/BE92/00024

§ 371 Date: Feb. 2, 1995

§ 102(e) Date: Feb. 2, 1995

[87] PCT Pub. No.: WO93/24304

PCT Pub. Date: Dec. 9, 1993

[51] Int. Cl.[6] .............................. B29D 7/00; B29C 39/16
[52] U.S. Cl. ................... 425/4 C; 425/817 C; 425/223; 425/224; 264/45.8; 264/46.2
[58] Field of Search ................................ 425/4 C, 817 C, 425/223, 224, 220; 264/45.8, 46.2, 51

[56] References Cited

U.S. PATENT DOCUMENTS

| | | | |
|---|---|---|---|
| 2,912,738 | 11/1959 | Bergling et al. | 425/89 |
| 3,214,793 | 11/1965 | Vidal | 425/75 |
| 3,354,503 | 11/1967 | Joseph et al. | 425/224 |
| 4,097,210 | 6/1978 | Romanillos | 425/224 X |
| 4,108,585 | 8/1978 | Proksa et al. | 425/89 |
| 4,120,626 | 10/1978 | Keller | 425/224 X |
| 4,216,177 | 8/1980 | Otto | 425/4 C X |

FOREIGN PATENT DOCUMENTS

| | | |
|---|---|---|
| 0127384 | 12/1984 | European Pat. Off. . |
| 55731 | 11/1968 | Luxembourg . |

*Primary Examiner*—Jill Warden
*Assistant Examiner*—E. Leigh Dawson
*Attorney, Agent, or Firm*—Finnegan, Henderson, Farabow, Garrett & Dunner

[57] ABSTRACT

The present invention relates to a device for the continuous manufacture of slabstock polyurethane foam including a conveyor means (1), a mixing head (51) and means (6) for discharging the reaction mixture from the mixing head (51) onto the conveyor means (1). The device further includes a start board (7), a stop board, means for moving the start board (7) along the conveyor means at the beginning of a production run in such a manner that it obstructs the moving reaction mixture to thereby increase the height of the first portion of the produced foam, and means for moving the stop board at the end of a production run in such a manner that it pushes the foaming reaction mixture ahead to thereby increase the height of the end portion. In this way, no operator has to enter the foaming machine and the start and end profiles of the foam blocks are optimised.

22 Claims, 4 Drawing Sheets

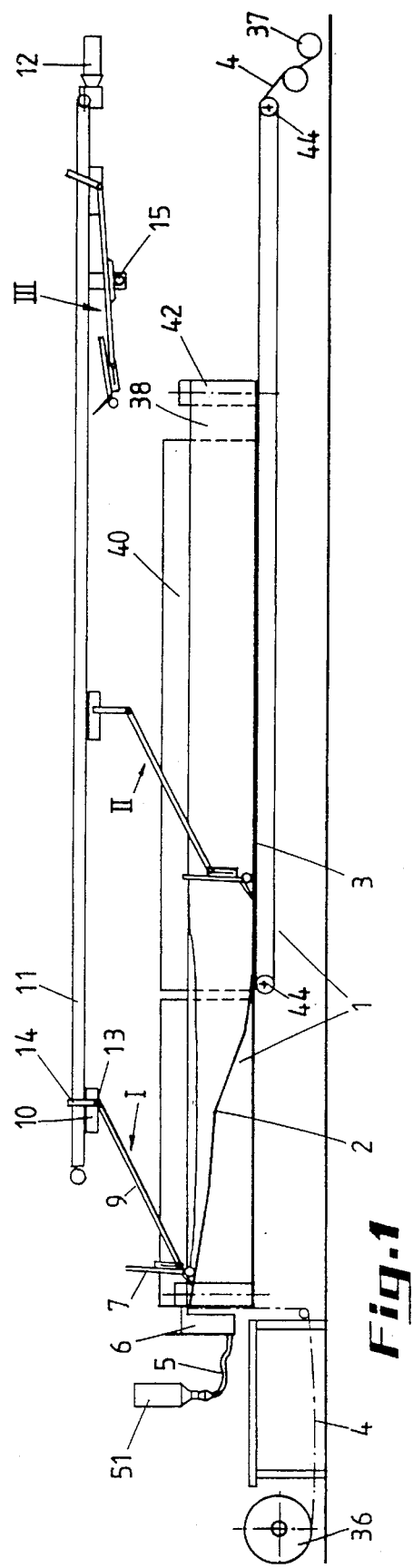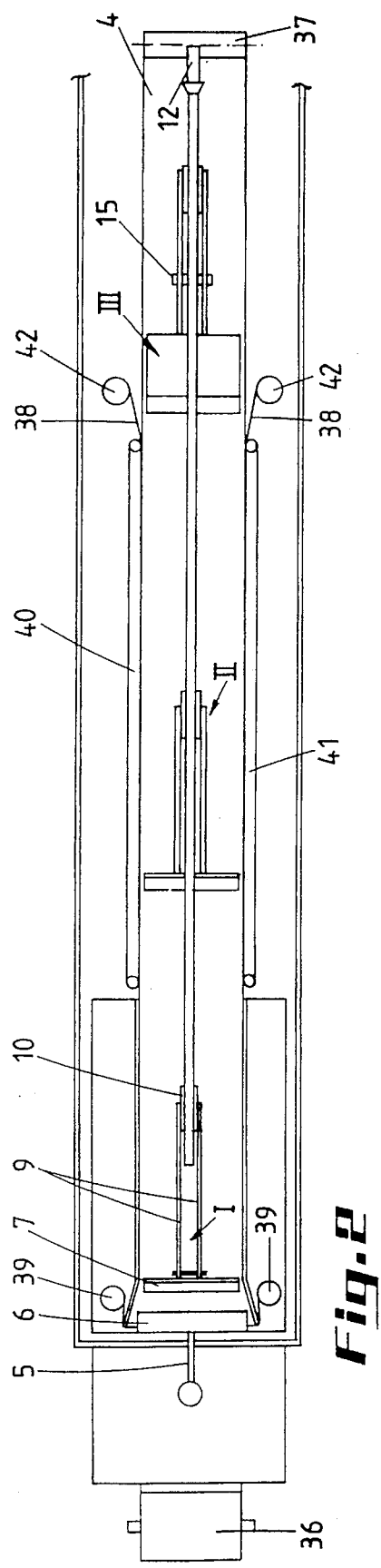

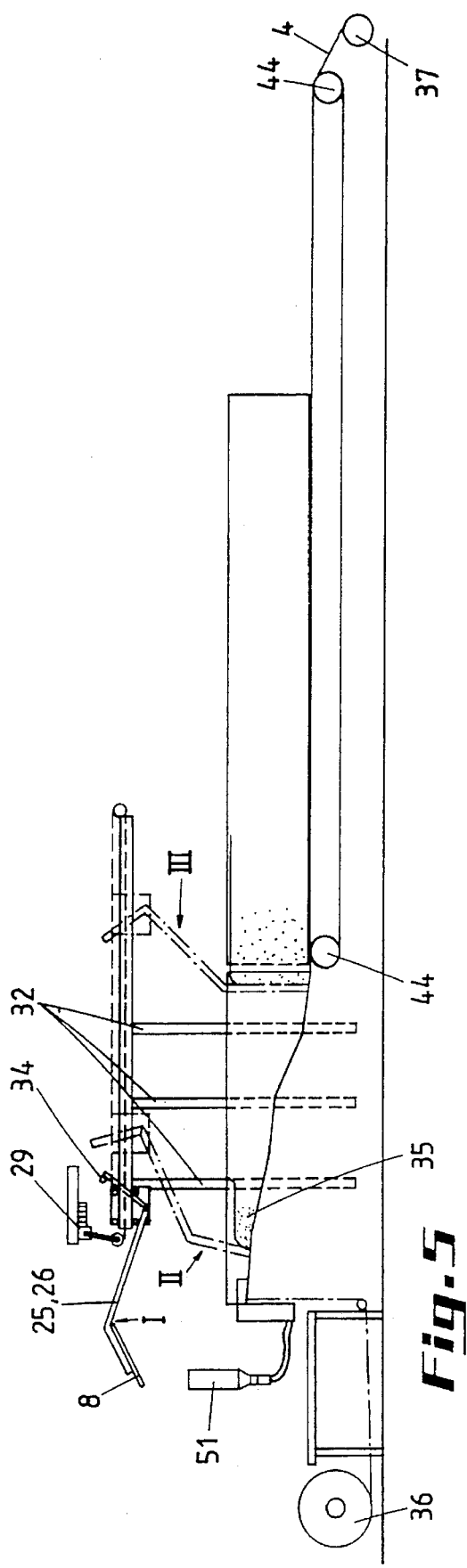
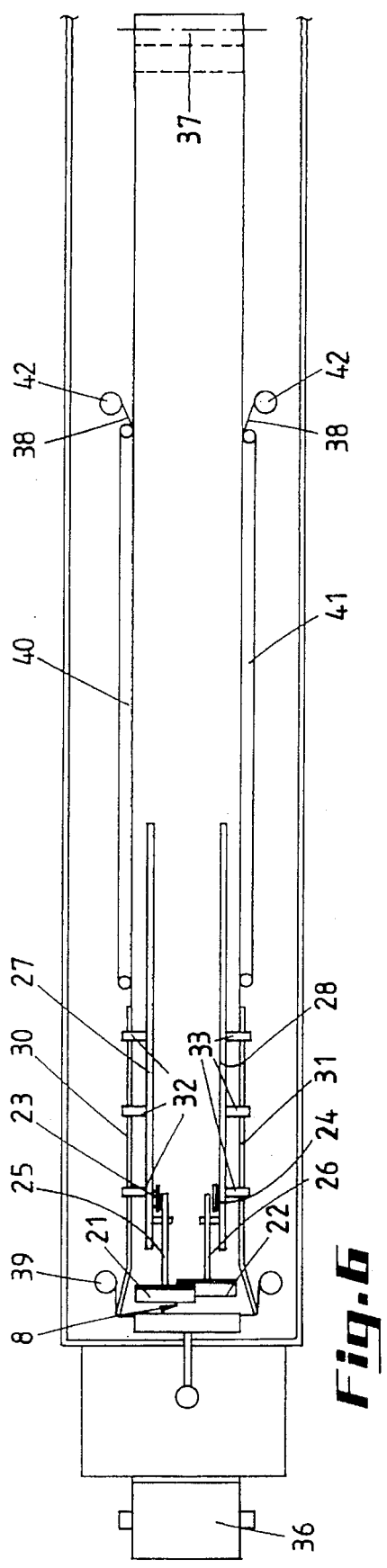

DEVICE FOR THE CONTINUOUS MANUFACTURE OF SLABSTOCK POLYURETHANE FOAM

The present invention relates to a device for the continuous manufacture of slabstock polyurethane foam comprising conveyor means, a mixing head for mixing polyurethane reaction components containing a blowing agent, means for discharging said reaction mixture onto said conveyor means and means for driving said conveyor means.

Such a device is generally known. In practice, use is made of different types of continuous foaming machines including the conventional inclined conveyor machines, either with or without planiblock, maxfoam and varimax machines. A problem with these known continuous foam production machines is that a manual operation is required as well at the beginning of a foam production run as at the end thereof in order to obtain a useful front and end portion of the slabstock foam. Without the manual intervention of an operator, both the first and the last foam portion of a production run would decline slowly to the respective extremity of the slabstock foam resulting in a loss of several meters of foam.

In the known machines, the operators use for example a board fixed at the end of a long pole to retain the first portion of reaction mixture while they stand on the first conveyor. As the conveyor starts running, the start board retaining the foaming reaction mixture moves also over the conveyor means. At the end of a production run, the operators push the last portion of reaction mixture forwards in order to obtain an end portion of the desired height.

A drawback of the known devices consists in that in some cases the operators have to enter the foaming machines both at the start and at the end of a production run to realize the desired foam profile. It is clear that this may be dangerous and harmful to their health due to the production of noxious gases during the foam process.

Moreover, the obtained foam profile depends on the skill and experience of the operator. In fact, the operator has no direct control of the foam height but the effect of the manual manipulation of the foaming reaction mixture can only be seen after a certain time, more particular after the time required by the foam to reach its final height. Further, the rise process of the reaction mixture depends on its composition, and more particularly on its blowing agent content, so that this composition has also to be taken into account when manipulating the reaction mixture to obtain the desired foam profile.

An object of the present invention is to provide a device for the continuous manufacture of slabstock polyurethane foam which allows control of the foam profile at the beginning and the end of a production run without requiring operators to enter the foaming machine and which optimises the start and end profile of the foam blocks.

To this end, a device according to the invention is characterised in that it comprises moreover a start board and a stop board, means for positioning said start board transversely onto said conveyor means near the place of discharge of said reaction mixture at the beginning of a production run, means for moving the start board along said conveyor means in such a manner that the start board obstructs, in a first phase, the reaction mixture moving over said conveyor means to thereby increase the height of the front portion of the produced slabstock polyurethane foam more particularly so that this front portion will substantially have the same height as a subsequent portion after full rise expansion, and in such a manner that it moves, in a second phase, substantially at the same speed as said conveyor means, means for removing the start board from said conveyor means after the front portion of the produced foam retains sufficiently its shape, means for positioning the stop board transversely onto said conveyor means near the place of discharge of said reaction mixture after the reaction mixture discharge is stopped, means for moving the stop board along said conveyor means after the positioning of said stop board so as to push the foaming reaction mixture ahead relative to said conveyor means to thereby increase the height of the end portion of the produced slabstock polyurethane foam, more particularly in such a manner that this end portion will have substantially the same height as a previous portion after full rise expansion.

The hereabove defined means of the device according to the invention enable a mechanical control of the start and end profile of the produced foam block so that these profiles do not depend any more on the manual manipulation of the operators. An important advantage of such a mechanical control is further that it allows control of the start and end profiles in a completely enclosed foam production machine, for example in a machine described in PCT-Patent Application n° PCT/EP91/02176 of the same applicant.

In a preferred embodiment of the device according to the invention said start board moving means are provided for maintaining the start board, in said first phase, in a standstill position and for starting to move the start board, substantially at the same speed as said conveyor means, as the foaming reaction mixture reaches a predetermined height against the start board.

In a particular embodiment of the device according to the invention, said stop board positioning means are adapted to position said stop board within a distance of 3 m, and preferably within a distance of 0.5 m, from the place of discharge of the reaction mixture.

In a further particular embodiment of the device according to the invention, said start board positioning means are adapted to position said start board within a distance of 3 m, preferably within a distance of 1.5 and in particular within a distance of 0.5 m from the place of discharge.

Other details and advantages of the invention will become apparent from the following description of some embodiments of a device for the continuous manufacture of slabstock polyurethane foam according to the invention. This description is only given by way of illustrative example and is not intended to limit the scope of the present invention.

BRIEF DESCRIPTION OF THE DRAWINGS

The reference numerals used in this description relate to the annexed drawings wherein:

FIG. 1 shows schematically a longitudinal sectional view of a device according to the invention, including the start board and the start board control means;

FIG. 2 is a schematical top plan view of the device as shown in FIG. 1;

FIG. 5 is a longitudinal sectional view corresponding to FIG. 1 but showing the stop board and the stop board control means instead of the start board and start board control means;

FIG. 6 is a schematical top plan view of the device as shown in FIG. 5; and

In these figures, the same reference numerals are used for the same or analogous elements.

Figure 3:
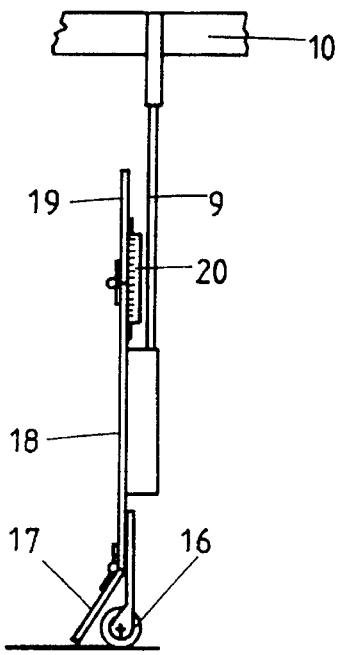
FIGS. 3 and 4 are side elevational views of a variant embodiment of the start board of FIG. 1 in two different positions.

The device for the continuous manufacture of slabstock polyurethane foam according to the present invention comprises, in general, conveyor means, a mixing head for mixing polyurethane reaction components containing a blowing agent, means for discharging said reaction mixture onto said conveyor means and means for driving said conveyor means. This device can be of different types including the inclined conveyor type (with and without planiblock), the Maxfoam type and the Varimax type. It is therefore clear that the invention is not limited to any one of these types, although the drawings represent only a Maxfoam machine.

The conveyor means 1 of the Maxfoam machine shown in the figures, comprise a fall-plate 2, a first bottom conveyor 3 and a bottom sheet 4 disposed longitudinally over the fall-plate 2 and the first bottom conveyor 3. The mixing head, indicated by reference 51, is connected by means of a duct 5 to the bottom of a trough 6. The reaction mixture supplied to this trough 6 foams up and arrives onto the bottom sheet 4, at the beginning of the fall-plate 2. During its transport over the moving conveyor means 1, the reaction mixture rises further and polymerizes to produce a foam block.

In order to obtain the desired block profile at the beginning and the end of a production run, i.e. a foam block, the height of which is substantially uniform towards the extremities of the block, the device according to the invention comprises a start board 7 and a stop board 8 and means for mechanically controlling the movements of these boards 7 and 8.

These control means comprise means for lowering and positioning the start board 7 at the beginning of a production run transversely onto the conveyor means 1 near the place of discharge of the reaction mixture, i.e. near the trough 6. The start board positioning means do not have to be fully mechanical but may need a manual manipulation of the operators since at the beginning of a production run, there is not any production of noxious gases yet so that the operators can enter the foaming machine without any risk.

The control means further comprise means for moving the start board 7 along the conveyor means 1 in such a manner that the start board 7 obstructs, in a first phase, the reaction mixture moving over the conveyor means 1 and that its speed is, in a second phase, substantially equal to the speed of the conveyor means 1. During said first phase, the reaction mixture is accumulated by the start board in order to increase the height of the front portion of the produced slabstock polyurethane foam, in particular so that this front portion has substantially the same height as a subsequent portion after full rise expansion.

The start board 7 may obstruct the foaming reaction mixture by moving at a smaller speed than the conveyor means 1. In a preferred embodiment, however, the start board 7 is maintained in a standstill position during said first phase. The second phase, wherein the start board 7 is moving at the same speed as the conveyor means 1, is then started as the foaming reaction mixture reaches a predetermined height against the start board 7. This moment can be determined, so that the start of a production run can be repeated each time in the same way. Moreover, said predetermined height can also be adjusted on the basis of the foaming properties of the reaction mixture. Preferably, the movement of the conveyor means 1 is started synchroneously with the movement of the start board 7.

In an effective embodiment, the start board positioning means are adapted to position the start board 7 within a distance of 3 m from the place of discharge of the reaction mixture, i.e. of the edge of the trough 6. Preferably, the start board 7 is positioned within a distance of 1.5 and in particular within a distance of 0.5 from the place of discharge. In this way the reaction mixture can be accumulated sufficiently by means of the start board 7 to obtain the desired height.

The device according to the invention comprises further means for removing the start board 7 from the conveyor means 1 after the produced foam retains sufficiently its shape or has in other words a sufficient dimensional stability.

The start board removing means comprise in particular means for accelerating the start board 7 in the travel direction of the foam and means for lifting the start board 7 after a sufficient gap is created between the front of the foam and the start board.

At the end of a production run, the stop board 8 is positioned transversely over the conveyor means, near the place of discharge of the reaction mixture by means of stop board positioning means. These means are adapted in particular to position the stop board within a distance of 0.5 m from the place of discharge of the reaction mixture. In this way, the final portion of the reaction mixture can be pushed forwards over the conveyor means in order to increase the height of the end or tail portion of the produced foam block. To this end, the device comprises means for moving the stop board 8 along the conveyor means at a speed higher than the speed of the conveyor means 1. In a conventional inclined foam machine, the conveyor means can be stopped at the moment the reaction mixture discharge is stopped. In a Maxfoam machine, the movement of the conveyor means is preferably stopped as the last portion of the reaction mixture is transported upto the first conveyor belt 3.

In the device shown in FIGS. 1 and 2 the start board 7 is connected by means of a first link arm 9 to a carriage 10 which is movable over a first overhead track 11 by means of a first variable speed motor 12. The first overhead track 11 is linear and runs substantially in the longitudinal direction of the conveyor means 1. In a variant embodiment, which is not shown in the figures, this overhead track 11 may be substantially parallel to the conveyor means 1, also above the fall-plate 2, in such a manner that the start board 7 and the first carriage 10 undergo substantially the same up- and downward movement when the start board is moving over the conveyor means 1. In order to compensate in this case for possible distance differences between the conveyor means 1 and the first overhead track 11, measured in the direction of the first link arm 9, this link arm 9 can be hingedly connected to both the carriage 10 at hinge 13 and to the start board 7.

When the foam machine is enclosed in an enclosure, for example for controlling the pressure during the foam process as disclosed in the PCT- Patent Application n° PCT/EP91/02176 of the same applicant, the first overhead track 11 is preferably linear so that the height of the foam machine is the same over its whole length. In this case, the first link arm can also be hingedly connected to the first carriage 10 and to the start board 7. However, in order to prevent that the speed of the start board 7 when moving over the fall-plate 2 would be too high in respect to the speed of the bottom sheet 4 moving also over this fall-plate 2, due to the counterclockwise rotation of the first link arm 9 around its upper hinge axis 13, the angle α between the first link arm 9 and the first track 11 is maintained constant during the downward movement over the fall-plate 2. This is realised in the embodiment shown in FIG. 1 by the fact that the first link arm 9 is slidably connected to both the first carriage 10 and to the start board 7.

The slidable connections between the link arm 9 and the carriage 10 may be directed in a manner such as to permit a substantially up- and downward movement of the start board 7. Preferably, the slidable connections are, however, directed somewhat obliquely so as to reduce the speed of the start board 7 over the fall-plate 2 still somewhat further in order to adjust the speed of the start board still better to the speed of the moving bottom sheet 4 by compensating for the downward speed component of the start board 7. By minimizing the speed differences between the start board 7 and the bottom sheet 4, the risks of damaging this bottom sheet are considerably reduced.

In order to further limit the risks of damaging the bottom sheet 4, means are preferably provided for reducing the pressure of the start board 7 onto the bottom sheet 4. This can be realised for example by using a counter weight to pull up the link arm 9 in the slidable connection with the carriage 10 or by providing a constant hydraulic pressure in this connection exerting an upwards force onto the link arm 9. The link arm 9 can then be fixedly connected to the start board 7 or analogous means can be provided in the slidable connection between start board 7 and link arm 9 to exert an upward force upon the start board 7.

In the embodiment shown in FIG. 1, the link arm 9 is hingedly connected to a slidable member 14 in the carriage. The downward rotation of the link arm 9 is, however, limited to the angle α in position I and II of the link arm in FIG. 1.

In position II, the foam has completed its rise and is sufficiently stable. The motor 12 is then accelerated so that a gap is created between the front of the foam block and the start board 7. The means for removing the start board 7 from the conveyor means 1 comprise a projection 15 which lifts mechanically the link arm 9 and the start board 7 as they pass this projection 15. FIG. 2, which is a top plan view of the device of FIG. 1, shows that the projection 15 is fixed to the overhead track 11 and that the link arm 9 comprises two parallel arms which are lifted both by this projection 15. It is clear that instead of mechanical lifting means, use can for example also be made of hydraulic lifting means.

FIG. 3 shows, on a larger scale, the start board 7 of the device represented in FIG. 1, being connected, however, by means of a vertical link arm 9 to the carriage 10. In fact, the link arm 9 may be disposed under different angles depending mainly onto the available space for the different components such as the overhead track 11 and the carriage 10. The start board 7 comprises a roller 16 for rolling over the conveyor means 1 so that the risk for damaging the bottom sheet 4 is further reduced. In order to keep the foaming reaction mixture away from this roller 16, a lower flap 17 is hingedly connected to a base part 18 of the start board 7.

Figure 4:
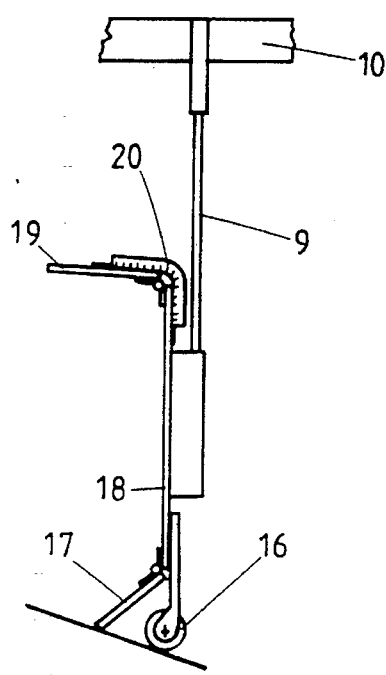

The start board 7 shown in FIG. 3 comprises moreover an upper flap 19 which is also hingedly connected to said base part 18 and which is maintained in its erected position by means of springs 20. In this way, the upper flap 19 can be pushed down, as shown in FIG. 4, when it touches any vertical obstruction, for example when the foaming machine is enclosed in a narrow enclosure.

FIGS. 5 and 6 show the stop board 8 and the mechanism for moving this stop board 8 along the conveyor means 1 at the end of a production run. As it can be seen from FIG. 6, the stop board 8 is composed of two mutually movable panels 21, 22, which partially overlap one another to permit width change. The panels 21, 22 are each hingedly connected to a separate carriage 23 and 24 respectively by means of cranked arms 25 and 26 respectively. Each of the carriages 23 and 24 is movable over a separate overhead track 27 and 28 respectively by means of a second variable speed motor 29. The overhead tracks 27 and 28 are each connected to the sidewalls 30 and 31 of the fall-plate 2 by means of brackets 32 and 33 so that as the foam width is varied, the stop board 8 is automatically set to the correct width.

The means for positioning the stop board 8 onto the conveyor means 1 comprise a stop 34 which maintains the stop board 8 in the rest position I shown in FIG. 5. By moving the stop board 8 into position II, it is automatically lowered onto the fall-plate 2. During its movement to position III, it pushes the foaming reaction mixture 35 forwards while this is moving over the fall-plate 2 so as to obtain the desired end block profile.

Even as the stop board 8, the start board 7 can also be composed of two mutually movable panels in order to allow an automatical width adjustment of the start board. Without such an automatical adjustment, the width of the start board has to be adapted to the width of the foam to be produced by replacing the start board.

An automatical width adjustment is also possible by using a start board and/or a stop board which comprises a central part, two side flaps which are hingedly connected to this central part and means for urging the side flaps towards the side walls 30, 31. These urging means can be formed for example by the fact that use is made of resilient side flaps. Further they can comprise springs or other resilient means. The central part itself can be composed of different elements, for example of the two mutual movable panels 21, 22.

Figure 7:
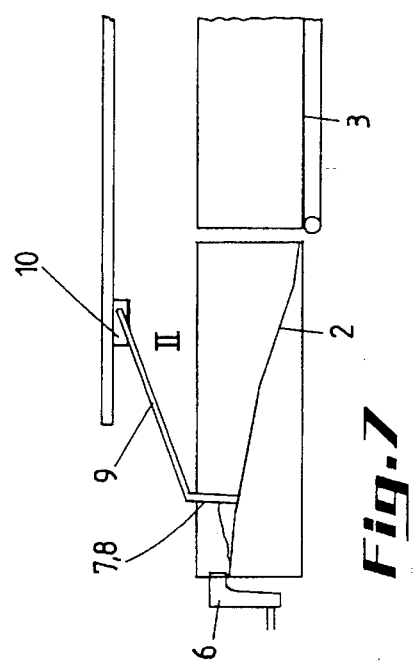
FIGS. 7 and 8 show schematically a longitudinal sectional view of a device analogous to the device shown in FIGS. 1 and 5 but wherein the start board and stop board are one and the same board.

Although in the above description, there is referred to a start board 7 and a stop board 8, the function of these board can possibly also be fulfilled by one and the same board 7, 8. Such an embodiment is shown schematically in FIGS. 7 and 8. In this embodiment, the board 7, 8 is fixed to the arm 9 which is hingedly connected to carriage 10. At the beginning of a production run, the board 7, 8 is lowered from a rest position I into position II onto the conveyor means 1 as shown in FIG. 7.

Figure 8:
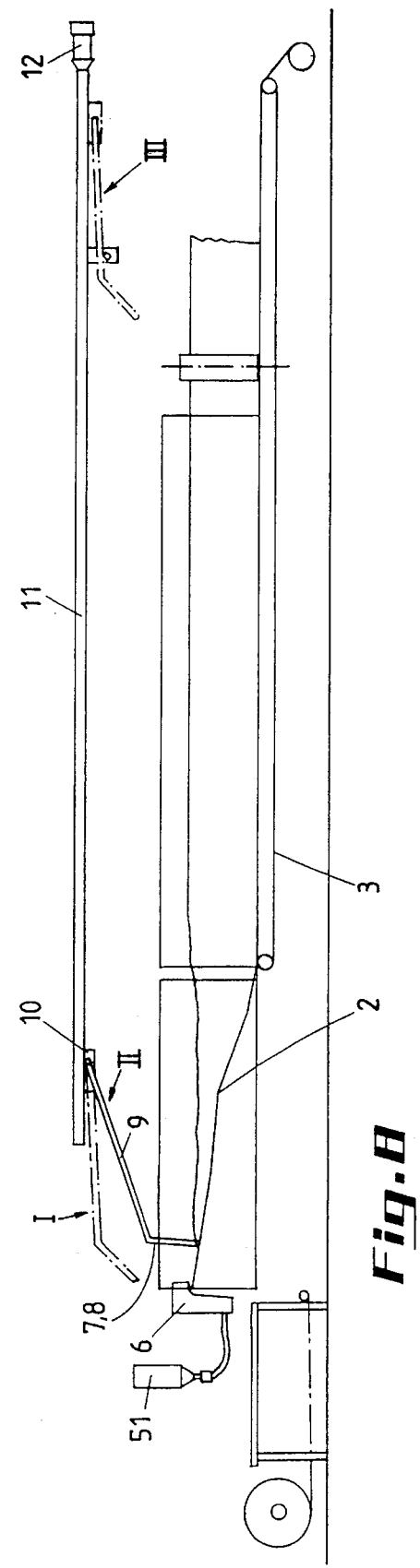

FIG. 8 shows the board 7, 8 in a third position III, wherein it is lifted above the end of the first bottom conveyor 3. From this position, the board 7, 8 is moved along the overhead track 11 by means of the motor 12 back to the beginning of the conveyor means 1, near the trough 6, and is lowered there again at the end of the production run, from position I to position II. The board 7, 8 is then moved along the conveyor means 1 to push the reaction mixture forwards to thereby increase the height of the end portion of the produced slabstock foam. In this embodiment, the means for lowering and lifting the board 7, 8 are for example hydraulic means which have not been represented in FIGS. 7 and 8.

Before starting a production run, the bottom sheet 4 is unrolled from feed mandrel 36, applied over the fall-plate 2 and the first bottom conveyor 3 and fixed to the rewind mandrel 37. The side sheets 38 are unrolled from feed mandrels 39, and fixed by means of double adhesive tapes to the side conveyors 40 and 41 and to side rewind mandrels 42. The lateral sides of the bottom sheet 4 are folded somewhat upwards against the side sheets 38.

At the beginning of a production run, rewind mandrel 37 exerts a large force onto the bottom sheet 4 to pull the front portion of the foam block over the fall-plate 2. Due to the considerable length of the bottom sheet 4, for example about 30 m, this bottom sheet may contract laterally so that it does not cover the total surface of the conveyor means. In order to prevent this, the invention proposes means for anchoring the bottom sheet 4 near the fall-plate 2 onto the first bottom conveyor 3 at the beginning of a production run.

In a first embodiment, these anchoring means comprise a flat weight having such a surface that it does not fall within the gap between the end of the first bottom conveyor 3 and the rewind mandrel 37. Additionally, means can be provided for lifting the weight as it reaches said gap.

In an effective embodiment of the invention, said anchoring means comprise a transverse row of pins 43 mounted onto the first bottom conveyor 3 and for automatically retracting these pins during the first revolution of this bottom conveyor 3. These retracting means ensure that the bottom sheet 4 is liberated from the pins at the end of the bottom conveyor 3.

Figure 9:
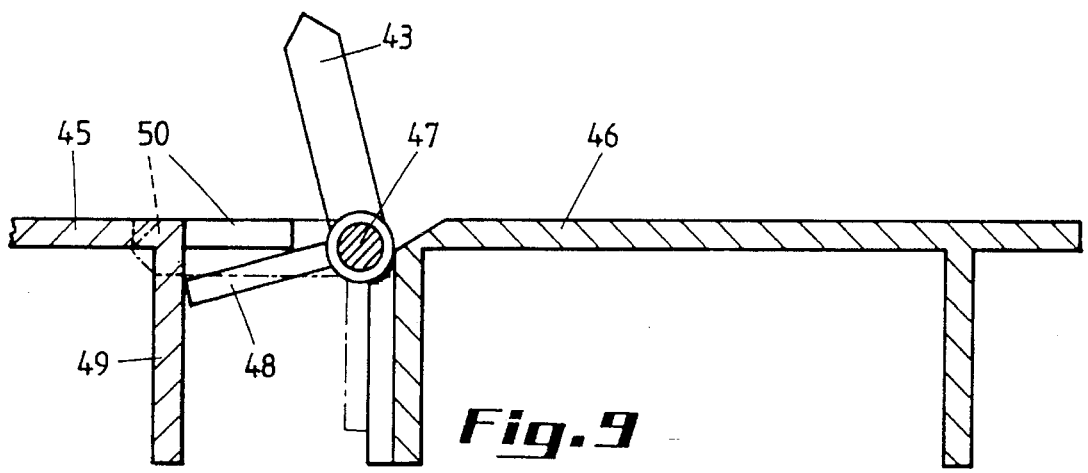
FIGS. 9 and 10 are longitudinal sectional views of the anchoring mechanism of a bottom sheet on the first bottom conveyor showing this mechanism in two different positions.
Figure 10:
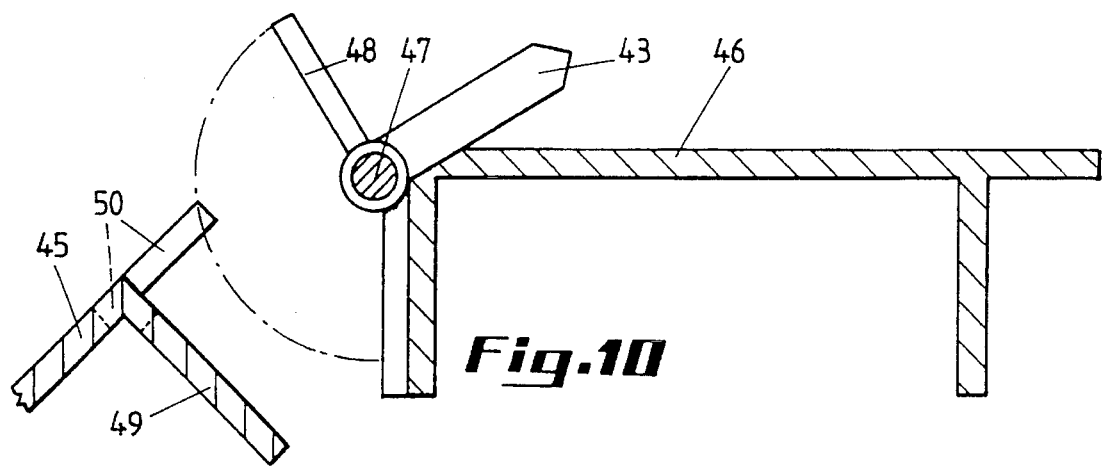

Such a mechanism is shown in FIGS. 9 and 10. The bottom conveyor 3 is made up of a series of transverse bottom slats which are hingedly connected to each other in such a manner that they can curve around the drive sprockets 44 of the conveyor 3. FIGS. 9 and 10 show two adjacent bottom slats 45 and 46 respectively in a flat position and in a position wherein these two slats are curved around a sprocket 44.

The row of pins 43 is rotably mounted on a transverse shaft 47 fixed to slat 46 in such a manner that the pins 43 can rotate from a retracted position wherein they are swung down under the surface of the conveyor to a position wherein they are turned over backwards as shown in FIG. 10. Springs are provided but not represented in the figures, to urge the pins 43 into the retracted position. These springs may act directly upon each the pins 43 or upon the shaft 47 in the event the shaft 47 is rotably fixed to slat 46.

In order to prevent the pins 43 from turning backwards when pulling onto the bottom sheet 4, at least one lever 48 is mounted on the shaft 43, and more particularly on the pins 43, the rotation of which lever 48 is limited in the flat position by means of a stop 49 on the adjacent slat 45, as shown in FIG. 9. When the pins reach the end of the conveyor 3, they should release the bottom sheet 4. As shown in FIG. 10, the release of the bottom sheet 4 is assured by a backward rotation of the pins 43. The backward rotation is possible due to the increased distance between both slats 45 and 46 when they are curved around the sprocket 44 so that lever 48 can freely pass stop 49 on slat 45. When the bottom sheet 4 is released, the springs swing the pins 43 back into the retracted position. In this position they are lying in cut-outs 50, underneath the surface of the conveyor. During the further rotations of the conveyor 3, they remain into this position until they are manually lifted to anchor a new bottom sheet 4 at the beginning of a next production run.

It will be clear that the invention is not limited to the hereinabove described embodiments but that these embodiments can be modified in many ways within the scope of the present patent application.

First of all, the start board and its control means could be designed in such a manner that they can be used to control the start profile as well as the end profile of the produced slabstock foam.

Further, use can be made of one and the same overhead track for both the start board and the stop board. To control the width of start board and/or stop board, they can be composed of two partially overlapping panels which can be displaced for example hydraulically along each other or as described hereinabove with respect to the stop board, by connecting these panels to two different displaceble overhead tracks.

The width of start and/or stop board can optionally also be controlled by means of hinged side flaps which are pushed against the side walls or the side conveyors for example by means of springs. Such side flaps can also be provided in combination with other width adjusting means, in which case they provide for a precise width adjustment so that a less accurate control of the other width adjusting means is required.

Even as the stop board, the start board can also be composed of two panels which are connected to two separate overhead tracks, optionally to the same overhead tracks as the stop board.

We claim:

1. A device for the continuous manufacture of slabstock polyurethane foam comprising:

conveyor means and means for driving said conveyor means;

a mixing head for mixing polyurethane reaction components containing a blowing agent;

means for discharging the reaction mixture from said mixing head onto said conveyor means at the beginning of a production run wherein said discharged reaction mixture expands to form a slabstock of foam on said conveyor means;

a start board and a stop board;

means for positioning said start board transversely onto said conveyor means adjacent the place of discharge of the reaction mixture at the beginning of a production run;

means for moving said start board along said conveyor means in a first phase and a second phase, wherein in said first phase said start board obstructs the reaction mixture moving over said conveyor means, to thereby increase the height of a front portion of the discharged reaction mixture so that the height of a front portion of the foam produced will have a height substantially equal to a height of a subsequent portion after the reaction mixture has achieved full rise expansion, and wherein in said second phase said start board is moved at substantially the same speed as said conveyor means;

means for removing said start board from said conveyor means;

means for positioning said stop board transversely onto said conveyor means adjacent the place of discharge of said reaction mixture when discharge of the reaction mixture has stopped; and means for moving said stop board along said conveyor means so as to push the reaction mixture ahead relative to said conveyor means and thereby increase the height of an end portion of the discharged reaction mixture so that the height of an end portion of the foam produced will have a height substantially equal to a height of a previous portion after the reaction mixture has achieved full rise expansion.

2. The device as claimed in claim 1, wherein said start board moving means maintains the start board stationary, in said first phase, and moves the start board at substantially the same speed as said conveyor means in a second phase, when the reaction mixture reaches a predetermined height against the start board.

3. The device as claimed in claim 2 comprising means for actuating said conveyor drive means substantially simultaneous with movement of said start board along said conveyor means.

4. The device as claimed in claim 1, wherein said start board removing means comprises means for accelerating movement of the start board in the direction of movement of the discharged reaction mixture on said conveyor means and means for lifting the start board after a predetermined gap is created between the front portion of the foam formed from the discharged reaction mixture and the start board.

5. The device as claimed in claim 1, wherein said stop board positioning means is adapted to position said stop board within a distance of 3 m from the place of discharge of the reaction mixture.

6. The device as claimed in claim 5, wherein said stop board positioning means are adapted to position said stop board within a distance of 0.5 m from the place of discharge of the reaction mixture.

7. The device as claimed in claim 1, wherein said start board positioning means is adapted to position said start board within a distance of 3 m from the place of discharge of said reaction mixture.

8. The device as claimed in claim 7, wherein said stop board positioning means are adapted to position said stop board within a distance of 0.5 m from the place of discharge of the reaction mixture.

9. The device as claimed in claim 1, wherein said start board positioning means and said start board moving means comprise a first overhead track running substantially in the longitudinal direction of the conveyor means, a first carriage movable along said first track, a first variable speed motor for moving said first carriage along said first track, at least one first link connected at a first end to said first carriage and at a second end to said start board, and means for lowering the start board by means of said first link arm onto the conveyor means.

10. The device as claimed in claim 9, wherein said first link arm is slidably connected to at least one of said first carriage and said start board whereby compensation for differences in distance between said first overhead track and said conveyor means can be accomplished.

11. The device as claimed in claim 10, wherein said conveyor means comprises a fall-plate and a conveyor, and where by said slidable connection allows vertical movement of the start board when the start board is moving over the fall-plate.

12. The device as claimed in claim 1, further comprising means for reducing pressure exerted by the start board onto the conveyor means.

13. The device as claimed in claim 1 wherein said start board comprises at least one roller for rolling over said conveyor means and a lower flap hinged about a substantially horizontal axis of the start board and provided to contact the conveyor means obliquely between said roller and the discharged reaction mixture.

14. The device as claimed in claim 1, wherein said start board comprises an upper flap which is hingedly connected to a base part of the start board and which folds down when colliding with an obstacle and further comprising resilient means for urging said upper flap to its erected position.

15. The device as claimed in claim 1 wherein at least one of said stop board and said start board are provided with means for automatically adjusting their width to the width of the discharged reaction mixture.

16. The device as claimed in claim 15 wherein at least one of said stop board and said start board comprises at least two mutually movable panels and means for mutually moving these panels to adjust the width of the respective board to the width of the discharged reaction mixture.

17. The device as claimed in claim 16 wherein said movable panels have portion overlapping one another and are each fixed by means of a separate link arm to a carriage movable over an overhead track in the longitudinal direction of the conveyor means, said device further comprising width adjusting means for adjusting the distance between said two link arms, said device comprising in particular one carriage and one overhead track for each of said two panels, each of said overhead tracks being fixed to one of two transversely adjustable side walls along a first part of said conveyor means.

18. The device as claimed in claim 15 wherein at least one of said stop board and said start board comprise a central part, two side flaps which are hingedly connected to said central part and means for urging said side flaps outwardly so as to adjust the width of the respective board automatically to the width of the discharged reaction mixture.

19. The device as claimed in claim 1 wherein said start board and said stop board are one and the same board.

20. The device as claimed in claim 1, wherein said conveyor means comprises:

a fall-plate followed by a conveyor, a bottom sheet disposed longitudinally over said fall-plate and said conveyor, and means for anchoring said bottom sheet to the conveyor at a location adjacent said fall-plate.

21. The device as claimed in claim 20, wherein said anchoring means comprises a transverse row of pins mounted onto said conveyor and means for automatically retracting said pins.

22. The device as claimed in claim 21, wherein said conveyor is comprised of a series of transverse slats mounted for rotation about a sprocket, and hingedly connected to each other, said hinge connection having an axis;

said row of pins rotatably mounted on a transverse shaft fixed to one of two adjacent slats at a position outward from the hinge axis of the two adjacent slats, said two adjacent slats defining cutout portions; and said retracting means further comprising spring means for urging said pins from a position wherein they project through the cutout portions between said two slats to a retracted position, at least one lever mounted on said shaft at a fixed angle with respect to said pins, and a stop provided for said lever on the slat of said two adjacent slats which does not have said transverse shaft fixed thereto, said stop limiting the rotation of said lever, thereby preventing a backward rotation of the projecting pins when said two adjacent slats are substantially in the same plane, and said stop allowing a backward rotation of the projecting pins when said two slats are in rotation about a sprocket of the conveyor so that a distance larger than the length of said lever is obtained between said shaft and said stop.

\* \* \* \* \*